United States Patent Office 3,065,148
Patented Nov. 20, 1962

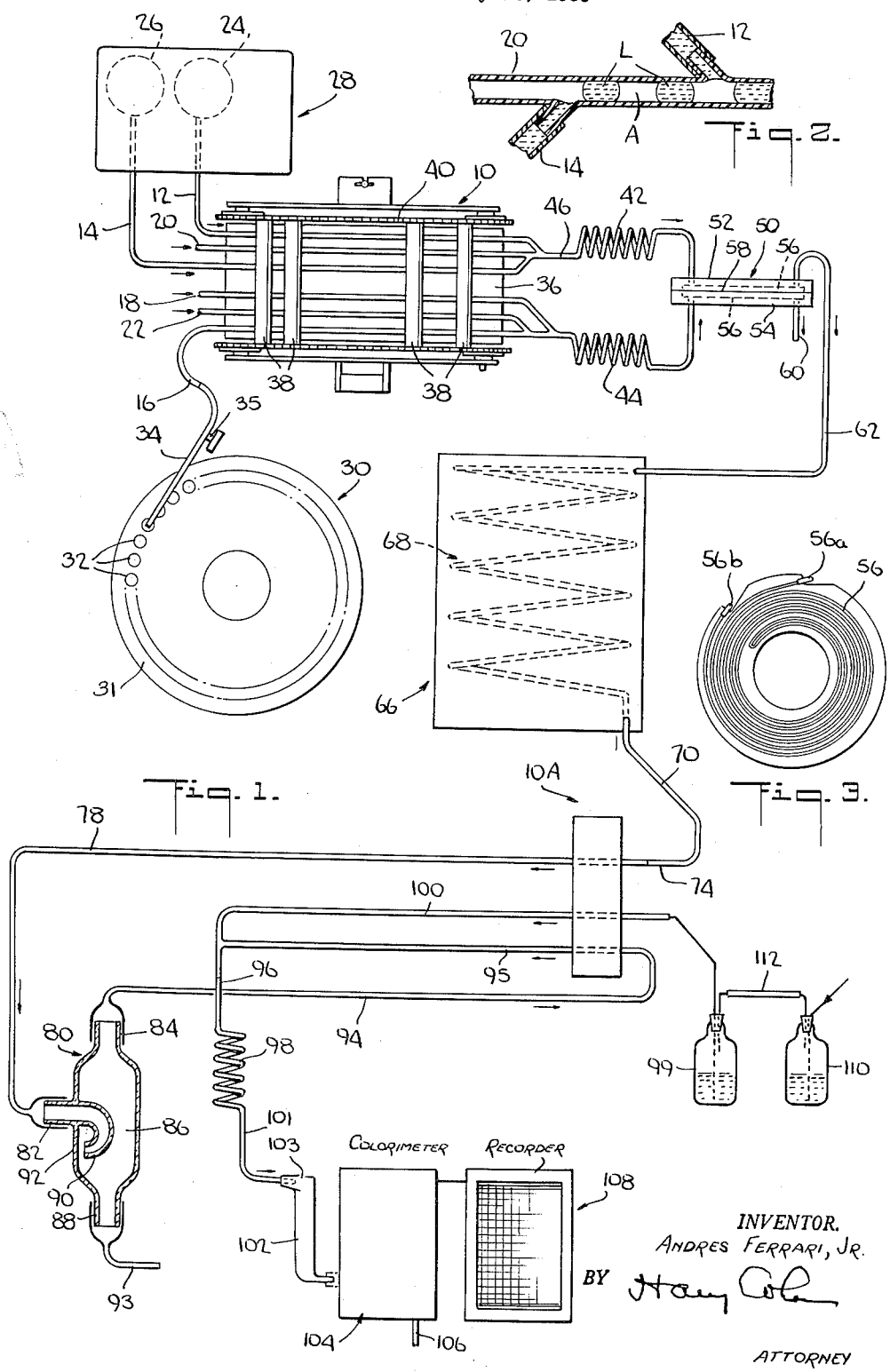

3,065,148
METHOD AND APPARATUS FOR USE IN CONDUCTING STUDIES ON CELLS
Andres Ferrari, Jr., Scarsdale, N.Y., assignor to Technicon Instruments Corporation, Chauncey, N.Y., a corporation of New York
Filed July 14, 1959, Ser. No. 827,075
12 Claims. (Cl. 195—103.5)

This invention relates to the art of biology. More particularly, the invention concerns a system and apparatus for use in the study of human and other animal cells and of cell growth in animal tissue, especially, but no limited to, cancer studies.

The apparatus and system of the present invention, provided pursuant to the underlying concept and objects thereof, enables the following important studies and experiments, for example, to be performed dynamically and automatically:

A. Culturing of the cells and study of their growth density cycles, their metabolic requirements, the products of their metalobism, etc.

B. Culturing of the cells and the study of the effects of various agents, carcinogenic in the case of cancer research and studies, on cell population, metabolic requirements, metabolism and the products thereof, inhibitive or enhancive effects on cell growth, etc.

Studies and experiments of the above-indicated character can be conducted, for example, according to the invention, on normal cells of a given cell type and on the corresponding cancer cells of that particular cell type. By continuous automatic analysis according to the invention, the chemistry of the metabolism of the cell culture, and the chemical requirements of the cells, as well as the chemistry of the products of their metabolism, can be studied and valuable data obtained which is not now readily available or obtainable. Moreover, the studies can be conducted under controlled conditions, in contrast to the conditions which are involved in the case of research and studies involving the use of animals, and with a degree of reproducibility which cannot be achieved with the use of animals in conducting similar studies or research experiments.

It is known that like animal cells evolve carbon dioxide. Accordingly, by measuring the quantity of evolved $CO_2$ it is possible to obtain an indication of the number of cells present in a given medium under a given condition, and the effects of various chemicals, drugs, etc., on the cells and other conditions and factors relating to cell growth or population can be studied. In accordance with the present invention, automatically operable apparatus is provided for subjecting animal cells to various conditions and to treatments with various substances under investigation and to measure the evolved $CO_2$ under such conditions or as a result of such treatments, for obtaining information or data pertinent to the study being made or to the purpose of an experiment or research work, thereby eliminating or greatly reducing the need to use animals while at the same time enabling various experiments to be repeated under conditions which can be better controlled than with the use of animals. Also, it will be understood that the present invention greatly facilitates the performance of the various experiments and greatly reduces the time required to conduct them and to obtain the indicated information or data.

In accordance with this invention, the living tissue cells which are to be studied are disposed in any well known neutral liquid medium and a liquid nutrient is added to form a liquid cell culture. These liquids are well known to biologists and others skilled in the art to which this invention relates and therefore no specific description thereof is necessary. Likewise, since the present invention does not concern any specific substance to be investigated in respect to the effect thereof on the cells, but rather envisages the investigation of many substances, no specific cell effecting substance need be mentioned for the disclosure of the invention.

The above and other objects, features and advantages of this invention will be fully understood from the following description considered in connection with the accompanying illustrative drawing.

In the drawing:

FIG. 1 is a more or less schematic view illustrative of the method and apparatus;

FIG. 2 is a fragmentary view of a tubular passage illustrating the formation of liquid and air segments in the stream of fluid; and FIG. 3 is a plan view of the inner face of a grooved dialyzer plate of a dialyzer utilized in the practice of this invention.

Pursuant to the present invention, according to the example which will now be explained with reference to the accompanying drawings, the apparatus for performing the method comprises a proportioning pump 10 which is operable to transmit the liquid nutrient, the liquid which contains the cells, and the cell growth affecting substance, i.e., the inhibitor or the enhancer, as the case may be, in predetermined relative proportions in the form of flowing streams, respectively, through tubular conduits 12, 14 and 16, respectively. Said pump is also operable to transmit a stream of a diluent, for example, water through tube 18, and streams of air or other inert gas through tubes 20 and 22, respectively. The liquid nutrient or broth and the cell-containing liquid are provided in the receptacles 24 and 26, respectively, kept in a refrigerator or cooler 28. It will be understood that tubes 12 and 14 extend from the receptacles 20 and 22 in the refrigerator to the proportioning pump 10. The various chemicals under investigation, in liquid form or in a liquid vehicle, are supplied, as here shown, by the rotary supply device 30. Said rotary supply device comprises a rotary plate 31 provided with a plurality of circumferentially spaced recesses 32 in which open top receptacles are removably held. A pick-up tube indicated at 34 is connected to the supply tube 16 and is pivotally moved into and out of the receptacles in receses 32, respectively, in timed relation to the rotation of said supply device. The supply device 30 is preferably of the construction and operation described in the U.S. application of Jack Isreeli, Serial No. 666,403, filed June 18, 1957, and as described in said application, plate 31 is rotated intermittently about a vertical axis by a Geneva gear mechanism and the pick-up tube indicated at 34 is pivotally moved at the pivot 35 into and out of each receptacle by suitable mechanism in timed relation to the intermittent movement of rotary plate 31. The proportioning pump 10 is preferably of the type which comprises a plurality of resilient tubes whose lumens or internal diameters are of the correct size according to the desired flow rates of the fluids transmitted through said tubes, respectively, by the operation of the pump. More particularly, the above-mentioned tubes 12, 14, 16, 18, 20 and 22 extend longitudinally in parallel relation over a platen 36 and a series of pressure rollers indicated at 38 are moved progressively along the lengths of said tubes by an endless belt conveyor 40 for progressively closing the tubes along their lengths and thereby transmitting the fluids through the tubes. A pump of this type is shown and described in U.S. Patent No. 2,893,324, issued upon application Serial No. 628,030 filed by me and Jack Isreeli December 13, 1956.

The apparatus also includes the mixing coils 42 and 44 which are preferably constituted by helical glass tubing of suitable longitudinal extent whereby a plurality of liquids which are supplied to the inlet end of the coil are thoroughly mixed with each other during the passage of said liquids therethrough. As hereshown, the tubes 12 and 14 which supply the nutrient and the cell-containing liquid are connected to the inlet end of coil 42 whereby these liquids are thoroughly mixed during the passage thereof through the coil. Air or other inert gas, free of $CO_2$, which is supplied through the tube 20 during the operation of the pump divides the liquid stream composed of the liquids flowing through tubes 12 and 14 into spaced segments L of liquid separated by intervening segments A of air as illustrated in FIG. 2, so that the fluid stream which passes into the inlet end 46 of coil 42 and flows through said coil is constituted by a stream of spaced liquid segments with intervening segments of air. Tubes 16 and 18 through which the inhibitor or the enhancer, as the case may be, and the diluent flow, are connected to the inlet end of mixing coil 44 so that said liquids are thoroughly mixed with each other during their passage through said coil. Also, as here shown, air is supplied through the tube 22 and serves to segmentize the fluid stream into alternate liquid and air segments as just described with reference to the liquids and air supplied by tubes 12, 14 and 20.

According to the present invention, provision is made for diffusing the substance under investigation into the liquid flowing from the outlet of coil 42. Pursuant to this invention, the diffusion means comprises a dialyzer indicated at 50, which is preferably of the construction described in U.S. Patent No. 2,864,507. Said dialyzer comprises confronting companion plates 52 and 54 each having a spirally grooved surface as indicated at 56 in FIG. 3, which provides a continuous tubular channel between the inner surface of each plate and the confronting surface of the dialyzer membrane or diaphragm 58 which is clamped between the two plates. The spiral grooves 56 in the plates 52 and 54, respectively, are mirror duplicates of each other, whereby the fluid which enters the dialyzer at one side of the membrane flows in the same direction as the fluid which enters the dialyzer at the other side of the membrane. It will be noted that the outlet ends of coils 42 and 44 are connected to the dialyzer at opposite sides, respectively of the membrane 58. In FIG. 3, the inlet and outlet ends of the grooves are indicated at 56a and 56b, respectively. It will be understood that the spiral groove in one of the plates registers with the spiral groove in the companion, so that as the liquids flow through the tubular passages defined by said grooves and the interposed membrane 58, the substance which is present in one of the fluid streams at one side of the membrane and passes through the membrane is diffused into the fluid stream at the other side of the membrane. More specifically, in the course of the flow of the fluids through the dialyzer at the opposite sides of the membrane some of the liquid containing the substance under investigation diffuses across the dialyzer membrane into the stream of liquid which comprises the cells and the nutrient and the rest of the liquid is discharged to waste through the outlet indicated at 60 connected to the outlet end 56b of the dialyzer groove. The outlet 56b at the other side of the dialyzer membrane is connected by a tube 62 to an incubator 66 which is maintained at the required temperature in any suitable way. Said incubator may be of any suitable or well known type and is preferably in the form of a glass coil 68 of sufficient length according to the required period of incubation, the time required for the flow of the fluid stream through the incubator coil corresponding to the required incubation period.

The outlet 70 of the incubator 66 is connected to the resilient pump tube 74 of a proportioning pump which is of the same construction as pump 10 and is here shown in block illustration at 10A.

The fluid which is discharged from outlet 70 is composed of segments of liquid separated from each other by gaseous segments which are composed of air previously introduced into the fluid stream through pump tube 20 and $CO_2$ which is evolved from the cells and diffused into said air in the course of the flow of the cell-containing liquid through the incubator 66. Pump tube 74 is connected by a tube 78 to a gas and liquid separator 80. More particularly, said gas and liquid separator 80 is preferably formed of glass but may be made of other material inert to the fluids supplied thereto and is provided with an inlet 82 for the fluid stream supplied thereto by the tube 78, with an outlet 84 for the gaseous fluid separated from the liquid in the separator chamber 86, and with an outlet 88 for the liquid separated from the gaseous fluids in said chamber 86. Preferably, as here shown separator 80 including the inlet tube 82, the outlets 84 and 88 are in integral relation with the chamber part 86. It will be observed that inlet 82 terminates in a reflexed nozzle portion 90 which directs the fluid against the adjacent side wall 92 of the separator so that the liquid runs down the side wall by gravity and under gaseous pressure as hereinafter more specifically described to the outlet 88 from which it is conducted to waste or for some other operation by tube 93.

The gaseous fluids, consisting of a mixture of air and carbon dioxide flow from the outlet 84 through a tube 94 and pump tube 95 to the inlet 96 of mixing coil 98. A weak alkaline solution containing a color reagent is supplied from the receptacle 99 via tube 100 to the inlet end of said mixing coil 98 whereby the carbon dioxide flowing through said coil is effectively treated with said alkaline solution containing said color reagent. In the course of the flow of the gaseous and liquid fluids through mixing coil 98 the carbon dioxide is dissolved in said alkaline solution and the resulting fluid stream composed of segments L of said liquid and intervening segments G of air, which is also illustrated by FIG. 2, flows through tube 101 to the upper end of the blender tube or chamber 102 which is connected at its lower end to the flow cell or curvette of a colorimeter 104 of the flow-cell type. In chamber 102, the liquid segments are blended and consolidated into a liquid column and the air or other gas not absorbed into the liquid is vented from the blender 102 through the outlet 103 thereof. The liquid outlet from the flow cell of said colorimeter is indicated at 106. As here shown, recorder 108 is operable under the control of the phototube circuit of the colorimeter 104 in a well known way, for controlling the operation of the recorder 108 which is of the well known self-balancing slide wire type. As colorimeters and recorders of the type just referred to are well known and do not per se form part of the present invention, it is considered that further description of either the colorimeter or the recorder is unnecessary.

It will be observed that air at atmospheric pressure is supplied to the regeant bottle 99 for the required aspiration of said reagent through pump tube 100. If said air (or other inert gas) is not free of carbon dioxide, it is first passed through a receptacle 110 containing sodium hydroxide for abstracting any carbon dioxide which may be present, and the air free of carbon dioxide is supplied to reagent bottle 99 through the tube 112. It will be understood that the air or inert gas which is supplied through tubes 20 and 22 is also either free of carbon dioxide or treated for that purpose by washing it with sodium hydroxide by connecting said tubes 20 and 22 to the outlet of a bottle (not shown) similar to bottle 110, containing sodium hydroxide through which the air bubbles before entering tubes 20 and 22.

The liquid which is discharged from incubator 66 into pump tube 74 contains carbon dioxide in an amount proportional to the cell population as increased or decreased, as the case may be, by the treatment of the source liquid under investigation, supplied from receptacle 26, with the drug or chemical under investigation, supplied from supply device 30. Said carbon dioxide is or may be partly dissolved in the liquid as it leaves the incubator 66 and is or may be partly present as free carbon dioxide in the form of gas bubbles mixed with the air or inert gas supplied through pump tube 20.

It will be understood that the present invention is not concerned with any specific chemical method of measuring the quantity of evolved $CO_2$ resulting from the treatment of the source materials under investigation with various substances under investigation in respect to their respective effects as inhibitors or enhancers of growth in tissue-cell population. On the other hand, as earlier indicated herein, the invention is based upon the principle that the quantity of evolved $CO_2$ is a measure of the number of tissue cells present in a tissue specimen, for $CO_2$ is evolved from every living cell, and the chemistry per se of measuring evolved $CO_2$ is well known and can be readily applied in the use of the apparatus and method of this invention. However, by way of example and without limitation it may be stated that the liquid containing the color reagent is prepared with a carbonate-bicarbonate buffer composed of one part of 1 molar carbonate ($Na_2CO_3$) to two parts of 1 molar bicarbonate ($NaHCO_3$). The color indicator is made up of one gram of phenolphthalein in 100 ml. of methyl alcohol. The alkaline liquid color reagent is prepared by mixing 4.5 ml. of said buffer and 4.0 ml. of said indicator with sufficient distilled water to make up one liter of the liquid, a few drops of caprene alcohol being included as an anti-foaming agent.

It will be understood that the invention may be employed not only with reference to animal cells but also with reference to plant cells for determining, for example, the effect of an antibiotic, a vitamin, or other substance on bacterial cell population as measured by the quantity of evolved $CO_2$. In such use of the invention, the broth or nutrient would be supplied from the receptacle 24, and the inoculum, bacterial cells, for example, would be supplied from the receptacle 26, and the substances under investigation would be supplied by the device 30, all as described in my U.S. application, Serial No. 719,847, filed March 7, 1958, except that in the present application the effect of the substances under investigation on the cells is determined by measuring the evolved $CO_2$ as described above with reference to the animal cells. As a further example of the utility of this invention, it is applicable to investigations of cells of unicellular origin, such as the saccharomyces which include yeast cells. Thus, it is seen that my present invention is applicable generally to biological assays in respect to animal cells and also to plant cells, i.e., the schizomycetes and the saccharomyces, which have a $CO_2$ metabolism.

It will be understood that as explained in my U.S. application Serial No. 719,847, filed March 7, 1958, the introductin of air or other gas into the tubular passages of the apparatus is desirable especially because of the resulting cleansing action of the stream of air segments on the walls of said passages. Further in the case of tube 34, air is admitted each time said tube is raised out of a receptacle 32 and this air serves to separate from each other the substance under investigation as treated by the treating substances, respectively, supplied from the receptacles 32, respectively, during the flow of the stream of the treated substance through the system.

While I have shown and described the preferred embodiment of my invention, it will be understood that the invention may be embodied otherwise than as herein specifically illustrated or described and that certain changes in the form and arrangement of parts and in the specific manner of practicing the invention may be made without departing from the underlying idea or principles of this invention within the scope of the appended claims. As used in the claims the term cells mean plant cells as well as human and other animal cells.

What I claim is:

1. A method of determining the effect of a substance under investigation on cells comprising transmitting a stream of liquid containing said cells, a nutrient for said cells, and a predetermined quantity of said substance under investigation, first through a zone in which carbon dioxide is evolved from said cells during the flow of said liquid stream and thereafter through a zone in which a quantity of the evolved carbon dioxide is separated from the liquid phase of the stream and is formed into a gaseous stream, introducing said gaseous stream into a stream of liquid including a color reagent for the carbon dioxide, and colorimetrically examining said last mentioned liquid stream after the introduction therein of said gaseous stream.

2. A method of determining the effect of a substance under investigation on cells, comprising transmitting a stream of liquid containing said cells, a nutrient for said cells, and a predetermined quantity of said substance under investigation, first through a zone in which carbon dioxide is evolved from said cells during the flow of said liquid stream, said stream of liquid comprising spaced segments of the liquid with segments of an inert gas free of carbon dioxide between successive liquid segments whereby carbon dioxide which is evolved from said cells is diffused into the gaseous segments, transmitting said fluid stream from said zone through a zone in which a quantity of the evolved carbon dioxide is separated from the liquid phase of the stream and is formed into a gaseous stream, and measuring the quantity of carbon dioxide in said gaseous stream to indicate the effect of said substance on said cells.

3. A method of determining the effect of a substance under investigation on cells, comprising transmitting a stream of liquid containing said cells, a nutrient for said cells, and a predetermined quantity of said substance under investigation, first through a zone in which carbon is evolved from said cells during the flow of said liquid stream, said stream of liquid comprising spaced segments of the liquid with segments of an inert gas free carbon dioxide between successive liquid segments whereby carbon dioxide which is evolved from said cells is diffused into the gaseous segments, transmitting said fluid stream from said zone through a zone in which a quantity of the evolved carbon dioxide is separated from the liquid phase of the stream and is formed into a gaseous stream, and introducing said gaseous stream into a stream of liquid including a color reagent for the carbon dioxide, and colorimetrically examining said last mentioned liquid stream after the introduction therein of said gaseous stream.

4. A method of determining the effect of a substance under investigation on live cells, comprising forming a stream of a liquid culture of live cells of a selected type, introducing an inert gas free of carbon dioxide into said liquid stream and introducing into said stream a predetermined quantity of a substance under investigation in respect to its effect on said cells, the introduction of said gas resulting in the formation of a fluid stream having therein successive segments of liquid separated from each other by segments of said gas, transmitting said fluid stream through a zone in which carbon dioxide is evolved from said cells, unless inhibited by said substance, and is diffused into said inert gas segments of the fluid stream, forming a gaseous stream of the diffused carbon dioxide, and quantitatively analyzing said gaseous stream for carbon dioxide as a measure of the effect of said substance on said cells.

5. Apparatus for determining the effect of a substance under investigation on cells comprising an incubator means for transmitting a stream of liquid containing said cells, a nutrient for said cells, and a predetermined quantity of said substance under investigation, first through a zone including said incubator in which carbon dioxide is evolved from said cells during the flow of said liquid stream, gas and liquid separator means, a conduit connected to said gas and liquid separator means for the flow thereto of the stream of fluid containing the evolved carbon dioxide, means for forming a stream of color-reagent liquid, means for introducing a stream of gas from said separator means into said stream of color-reagent liquid, and means for analyzing said last mentioned stream in respect to the effect of said gas thereon.

6. Apparatus for determining the effect of a substance under investigation on cells comprising means for forming a stream of fluid containing a liquid culture of the cells and a predetermined quantity of said substance and an inert gas, free of carbon dioxide, said gas dividing said fluid stream into successive flowing segments of said liquid separated from each other by flowing segments of said gas, in incubator, means for transmitting said segmented stream through said incubator wereby carbon dioxide which is evolved from said liquid segments is diffused into said gas segments, gas and liquid separator means, a conduit connected to said gas and liquid separator means for the flow thereto from said incubator of the stream of fluid containing the evolved carbon dioxide, means for forming a stream of color-reagent liquid, means for introducing gas from said separator means into said stream of color-reagent liquid, and means for analyzing said last mentioned stream in respect to the effect of said gas thereon.

7. Apparatus for examining a liquid culture of live cells, comprising means for forming a stream containing said liquid culture of the cells, an incubator conduit through which said stream flows for the incubator of said cells, gas and liquid separator means, means for transmitting said stream from said incubator conduit to said separator means for the separation from the liquid of carbon dioxide gas evolved from said cells, means for forming a stream of color-reagent liquid, means for introducing said gas from said separator means into said sream of color-reagent liquid, and means for analyzing said last mentioned stream in respect to the effect of said gas thereon.

8. Apparatus for examining a liquid culture of live cells, comprising means for forming a stream containing said liquid culture of the cells, an incubator having an inlet and an outlet, gas and liquid separator in flow-communication with said outlet of said incubator, means for transmitting said stream to the inlet of said incubator and from the outlet thereof to said gas and liquid separator means for the separation from the liquid of carbon dioxide gas evolved from said stream during the flow thereof means for withdrawing a stream of said gas from said separator means, and means for quantitatively analyzing said stream in respect to carbon dioxide.

9. Apparatus for examining a liquid culture of live cells, comprising means for forming a stream containing said liquid culture of the cells, means for introducing an inert gas, free of carbon dioxide, into said stream of liquid and thereby forming said stream into successive flowing segments of said liquid separated from each other by flowing segments of said gas, an incubator, means for transmitting said segmented stream through said incubator whereby carbon dioxide which is evolved from said liquid segments is diffused into said gas segmets, gas and liquid separator means, a conduit connected to said gas and liquid separator means for the flow thereto from said incubator of the stream of fluid containing the evolved carbon dioxide, means for withdrawing a stream of said gas from said separator means, and means for quantitatively analyzing said stream in resect to carbon dioxide.

10. A method of examining a liquid culture of live cells, comprising forming a flowing stream of said liquid, introducing an inert gas, free of carbon dioxide, into said stream of liquid hereby forming a fluid stream having therein successive segments of liquid separated from each other by segments of said gas, transmitting said fluid stream through a zone in which carbon dioxide is evolved from said cells, and is diffused into said inert gas segments of the fluid stream, withdrawing from said flowing stream a stream of gas containing carbon dioxide evolved from said cells therein, and treating said stream of gas, during the flow thereof, for colorimetric examination in respect to the carbon dioxide therein.

11. Apparatus for determining the effect of a substance on live cell, comprising an incubator having conduit means for transmitting a stream of liquid containing said cells, a nutrient for said cells, and a predetermined quantity of said substance under investigation, first through a zone including said incubator conduit in which carbon dioxide is evolved from said cells during the flow of said liquid stream, gas and liquid separator means, a conduit connecting said incubator conduit to said gas and liquid separtor means for the flow thereto from said incubator of the stream of fluid containing the evolved carbon dioxide, means for forming a stream of color-reagent liquid, means for introducing gas from said separator means into said stream of color-reagent liquid, and means for analyzing said last mentioned stream in respect to the effect of said gas thereon.

12. Apparatus for examining a liquid culture of live cells, comprising means for forming a stream containing said liquid culture of the cells, means for introducing air or other inert gas, free of carbon dioxide, into said stream of liquid and thereby said stream into successive flowing segments of said liquid separated from each other by flowing segments of said gas, an incubator having a conduit, means for transmitting said segmented stream through said incubator conduit whereby carbon dioxide which is evolved from said liquid segments is diffused into said gas segments, gas and liquid separator means, a conduit connecting said incubator conduit to said gas and liquid separator means for the flow thereto from said incubator of the stream of fluid containing the evolved carbon dioxide, means for withdrawing a stream of said gas from said separator means, and means for quantitatively analyzing said stream in respect to carbon dioxide.

References Cited in the file of this patent

UNITED STATES PATENTS 2,797,149     Skeggs _____ June 25, 1957

OTHER REFERENCES

Frobisher: "Fundamentals of Microbiology," 5th edition, published by W. B. Saunders Co., Philadelphia, 1953, pages 577 to 579.